United States Patent [19]

Tamai et al.

[11] Patent Number: 5,291,412
[45] Date of Patent: Mar. 1, 1994

[54] NAVIGATION SYSTEM

[75] Inventors: Haruhisa Tamai, Sunnyvale, Calif.; Tatsuhiko Abe, Saitama, Japan

[73] Assignee: Zexel Corporation, Tokyo, Japan

[21] Appl. No.: 856,716

[22] Filed: Mar. 24, 1992

[51] Int. Cl.⁵ .............................................. G06F 15/50
[52] U.S. Cl. .................... 364/449; 364/444; 340/990; 340/995
[58] Field of Search ............... 364/443, 444, 449; 73/178 R; 340/988, 990, 995

[56] References Cited

U.S. PATENT DOCUMENTS

| | | | |
|---|---|---|---|
| 4,774,671 | 9/1988 | Itoh et al. | 364/449 |
| 4,926,336 | 5/1990 | Yamada | 364/444 |
| 5,109,344 | 4/1992 | Kakihara et al. | 364/449 |
| 5,159,556 | 10/1992 | Schorter | 364/449 |
| 5,184,303 | 2/1993 | Link | 364/449 |

*Primary Examiner*—Gary Chin
*Attorney, Agent, or Firm*—Thomas R. Morrison

[57] ABSTRACT

A vehicle navigation system computes an optimal route from stored map data. Where the vehicle deviates from the optimal route, either by mistake or by choice, the driver can command computation of a new optimal route. The driver may choose whether or not to permit U-turns on the new route, thereby insuring that the original optimal route will not be retraced if his deviation was deliberate. Route guidance, deviation, and U-turn selection information is displayed to help the driver follow the original optimal route, to command computation of a new optimal route, and to choose whether or not to permit U-turns along the new optimal route.

15 Claims, 4 Drawing Sheets

NAVIGATION SYSTEM

BACKGROUND OF THE INVENTION

The present invention relates to vehicle navigation systems, and, more particularly, to a system for computing the optimal route from a starting point to a destination and guiding a vehicle according to the computed optimal route.

Generally, a vehicle navigation system computes the optimal route to a destination before the vehicle starts a journey. After the journey begins, the system computes local navigational guidance from the optimal route and the vehicle's present location in real time. The system gives this guidance from a starting point to a destination by presenting route information in real time on a CRT or similar display.

In cases where a vehicle has deviated from the optimal route (hereinafter called a "deviation"), a conventional navigation system generally recomputes the optimal route to the destination from a new starting point at the vehicle's present location after it has strayed. The system computes the new optimal route in the same manner as the old, in other words, to reach the destination in the shortest time or over the shortest distance. Thus the optimal route computed after a deviation may, depending on the case, require the vehicle to continue travelling in the same direction, or it may require a U-turn to retrace the original optimal route.

A vehicle deviates from an optimal route for one of two reasons: first, the driver makes a mistake; second, the driver makes a deliberate choice, for example, to avoid a traffic jam. In the latter case, should the recomputed route return the vehicle to the original route, the driver following the recomputed route as prescribed by the system may be forced into the very traffic jam he wanted to avoid. On the other hand, to avoid the traffic jam, he must deviate from the navigation system's optimal route, thereby losing the system's guidance.

Prior to the present application, the inventor of this application devised means to prevent a computation that retraces an original optimal route as a new optimal route by prohibiting a U-turn when computing the optimal route after a deviation. When a vehicle has deviated from its optimal route by mistake, however, the route that gets it to the destination in the shortest distance or the shortest time may indeed retrace the original optimal route. In that case, the preventive means causes inconvenience, because what is computed to be the optimal route under the constraint of no U-turns is not the true optimal route.

OBJECTS AND SUMMARY OF THE INVENTION

An object of the present invention is to provide a navigation system that overcomes the drawbacks of the prior art.

A further object of the present invention is to provide a system that allows a driver of a vehicle to choose whether or not to return to the original optimal route when a new optimal route is computed after the vehicle deviates from the original route, so that the driver may avoid driving through a traffic jam or along a route that is not truly optimal.

Briefly stated, the present invention provides a vehicle navigation system that computes an optimal route from stored map data. Where the vehicle deviates from the optimal route, either by mistake or by choice, the driver can command computation of a new optimal route. The driver may choose whether or not to permit U-turns on the new route, thereby insuring that the original optimal route will not be retraced if his deviation was deliberate. Route guidance, deviation, and U-turn selection information is displayed to help the driver follow the original optimal route, to command computation of a new optimal route, and to choose whether or not to permit U-turns along the new optimal route.

According to an embodiment of the invention, there is provided a navigation system, which comprises: means for storing map data, means for determining a present location of a vehicle with reference to said map data, means for commanding computation of a route to be traveled by said vehicle, means for computing, in accordance with said map data, an optimal route from a starting point to a destination, said means for computing being also effective for computing, in accordance with said map data, a new optimal route from said present location of said vehicle to a destination, means for displaying route guidance information generated by said means for computing, means for detecting whether said vehicle has deviated from said optimal route, and means for selecting one of allowing U-turns and preventing U-turns in following said optimal route from said present location.

According to a feature of the invention, there is provided a method of navigating a vehicle, which comprises the steps of: storing map data, determining a present location of said vehicle with reference to said map data, computing, in accordance with said map data, an optimal route from a starting point of said vehicle to a destination, computing further, in accordance with said map data, a new optimal route from said present location of said vehicle to said destination, displaying route guidance information generated by said means for computing, detecting, with reference to said optimal route and said present location, whether said vehicle has deviated from said optimal route, and selectively allowing and prohibiting the generation of display of data that returns said vehicle to an original optimal route.

According to a further feature of the invention, there is provided a navigation system for a vehicle, which comprises: a CD ROM containing map data, a shaft sensor mounted on said vehicle, a magnetic compass mounted on said vehicle, said shaft sensor and said magnetic compass cooperating to determine a present location of said vehicle with reference to said map data, a microcomputer including means for computing, in accordance with said map data, an original optimal route from a starting point to a destination, said microcomputer further including second means for computing, in accordance with said map data, a new optimal route from said present location of said vehicle to said destination, means for detecting, with reference to said original optimal route and said present location, whether said vehicle has deviated from said original optimal route, means for selectively allowing and prohibiting return of said vehicle to said original optimal route, means for displaying route guidance, deviation, and U-turn information generated by said microcomputer, said second means for computing including means for permitting said new optimal route to intersect said original optimal route in the minimum amount of time when said means for selectively allowing and prohibiting is in a mode of allowing, and said second means for computing further including means for preventing said new optimal route from intersecting said original optimal route in a minimum time when said means for selectively allowing and prohibiting is in a mode for prohibiting, whereby a traffic obstruction ahead on said original optimal route may be avoided.

In summary, when a driver of a vehicle operates a route computation command switch before starting for his destination, an optimal route computation means computes an optimal route from a starting point to the destination in accordance with map data written in map data storage means. At that time, the starting point for the computation may be chosen between the vehicle's present location as detected by a present location detecting means and a starting point input manually by the driver.

After starting the vehicle, a deviation detecting means judges whether the vehicle is off the optimal route, using the vehicle's present location detected by the present location detecting means. If the deviation detecting means judges that the vehicle has deviated from the optimal route, a deviation display appears driven by signals from the deviation detecting means.

When the route computation command switch and a U-turn selection switch are operated while the vehicle has deviated from the optimal route, the optimal route computing means computes the optimal route from the vehicle's present location to the destination. In cases where U-turn selection switch is set to prohibit a U-turn, the optimal route computing means chooses the optimal route from among routes that keep the vehicle headed in the same direction as the vehicle is headed, excluding any routes that call for a U-turn. If the U-turn selection switch is set to allow U-turns, the optimal route computing means finds the optimal route from among all the possible routes, including those calling for a U-turn.

The above, and other objects, features and advantages of the present invention will become apparent from the following description read in conjunction with accompanying drawings, in which like reference numerals designate the same elements.

BRIEF DESCRIPTION OF THE DRAWINGS

FIG. 5 shows information to be displayed on the screen of the display.

DETAILED DESCRIPTION OF THE PREFERRED EMBODIMENTS

Figure 1:
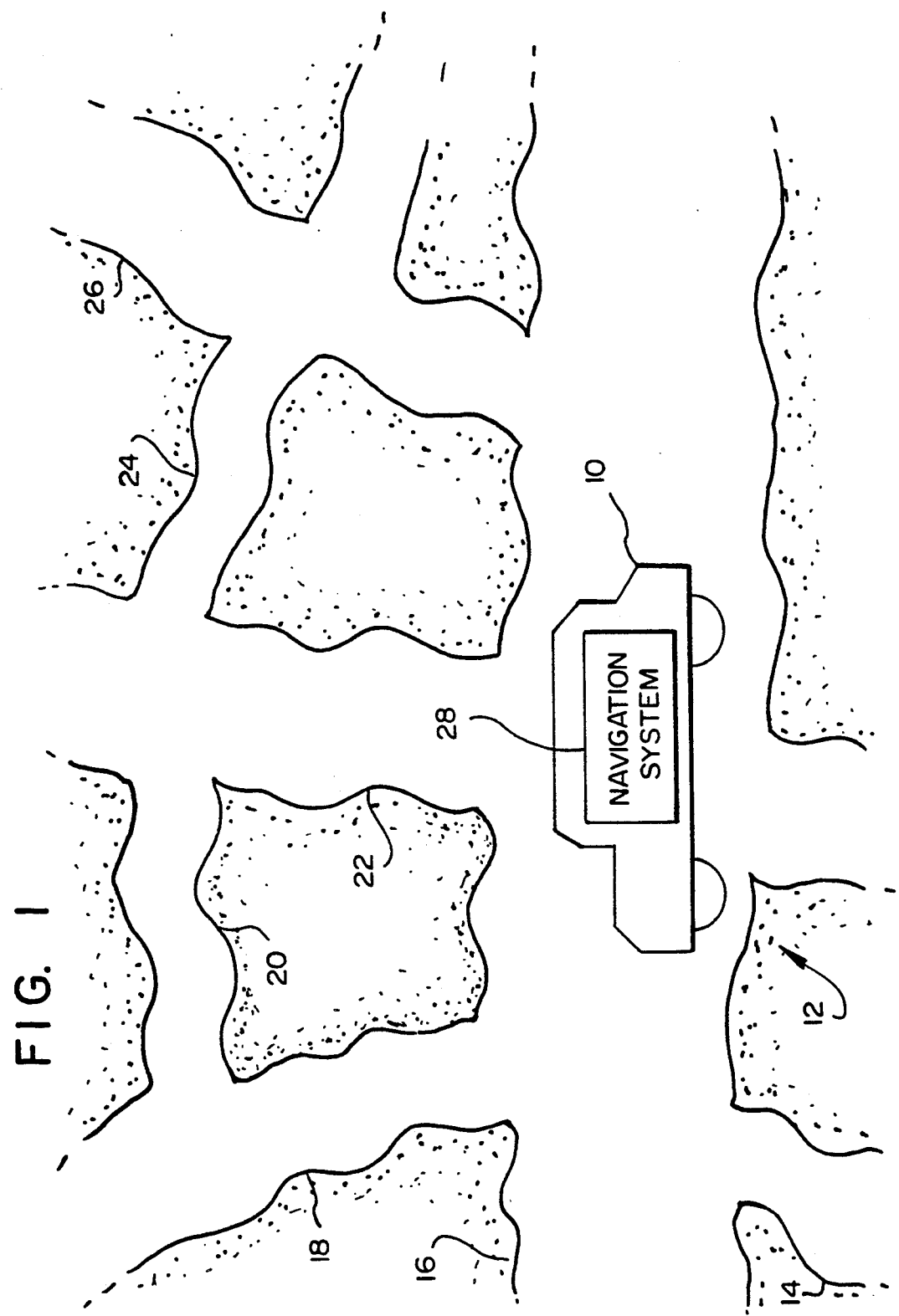
FIG. 1 is a simplified view of a vehicle moving over a road network. The vehicle has installed a navigation system of the present invention.

Referring to FIG. 1, a vehicle 10 moves over a road network 12 consisting of a plurality of roads 14-26. Vehicle 10 has installed therein a navigation system 28 that contains the apparatus of this invention.

Figure 2:
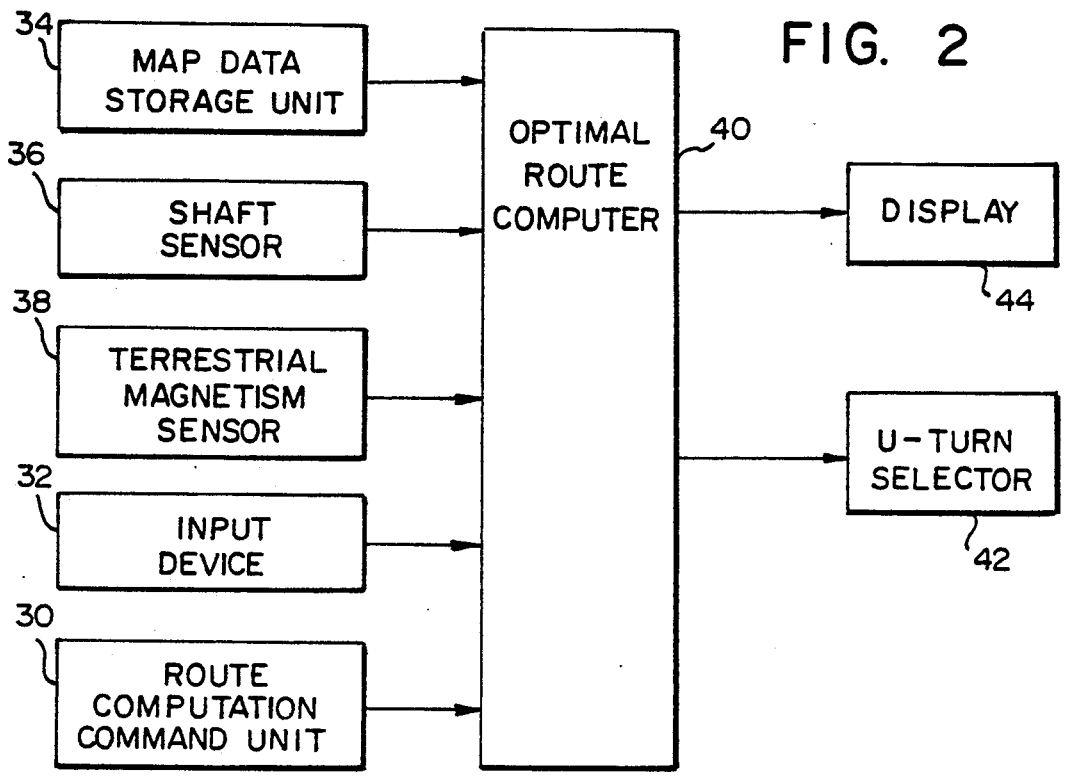
FIG. 2 is a schematic view of an embodiment of the system of the present invention.

Referring to FIG. 2, a driver of vehicle 10 initiates computation of an optimal route in navigation system 28 by instructing a route computation command unit 30. With the instruction to compute, the driver enters route data through input device 32. This data always specifies a destination; it may or may not specify a starting location. If input of a starting location is omitted, the starting location is derived from dead reckoning or external inputs such as, for example, GPS or Loran. From two inputs: map data, retrieved from a map data storage unit 34, and either present location data, communicated from a shaft sensor 36 and a terrestrial magnetism sensor 38, or a specified starting location, entered by the driver into input device 32, an optimal route computer 40 computes the optimal route. If the driver has so instructed a U-turn selector 42, the optimal route computation is made under the constraint that no U-turns may be made. Optimal route computer 40 also computes guidance for following the optimal route. The guidance is sent to display 44 for presentation to the driver.

Map data storage unit 34 may be comprised of any convenient device such as, for example, a CD-ROM or an IC card with map data written thereon, the map data including road network data and address data. Shaft sensor 36 communicates signals that correspond to a rotation speed of a drive shaft. Terrestrial magnetism sensor 38 detects the direction of the terrestrial magnetic field. Optimal route computer 40 computes distance travelled by vehicle 10 based on signals from shaft sensor 36 and a forward direction of vehicle 10 based on signals from terrestrial magnetism sensor 38. Display 44 is comprised of a CRT or other means for displaying data output from optimal route computer 40 on a screen.

Figure 5A:
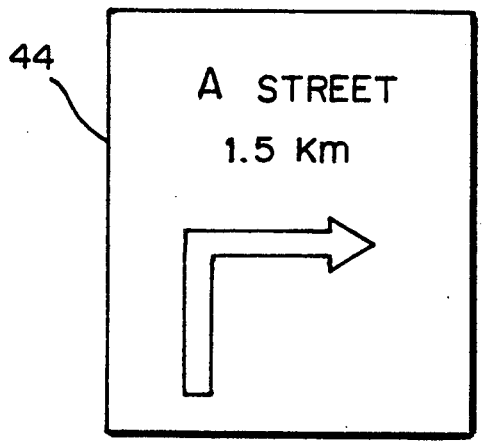
FIGS. 5(A)-5(C) within FIG. 5 represent respectively local navigation guidance, deviation data, and U-turn selection data.
Figure 5B:
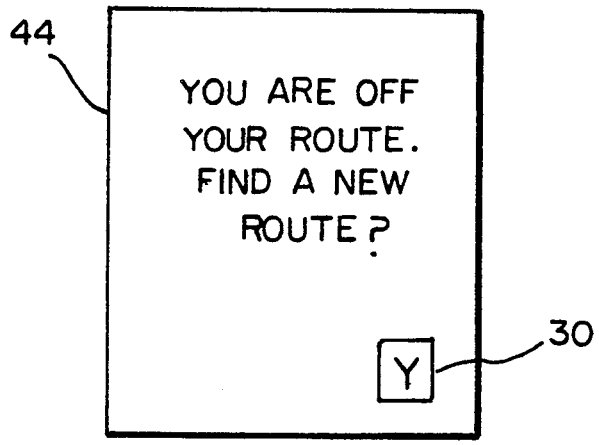
Figure 5C:
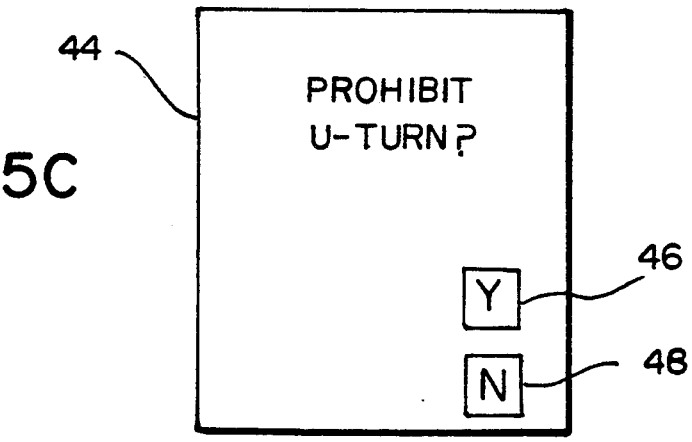

As shown in FIGS. 5(B) and 5(C), route computation command unit 30 and U-turn selector 42 may be provided in the form of touch keys on the screen of display 44.

Present location of vehicle 10 may also be computed from the GPSS (Global Positioning System with Satellite) using 3 or 4 satellites. In some systems, absolute positioning accuracy may be improved by about an order of magnitude using a fixed GPSS receiver which receives the GPS signals, and generates offset data indicating the difference between its known position and its position calculated from the GPS signals. This offset data can then be used to correct data in vehicle 10.

Optimal route computer 40 also computes the optimal route from a starting point to a destination based on map data from map data storage unit 34. The optimal route is computed to make the amount of time or distance from a starting point to a destination be least or to require the fewest number of right and left turns.

Although a starting point may be entered from input device 32, vehicle 10's present location is regarded as its starting point in the present embodiment.

Optimal route computer 40 computes route information for an optimal route and sends the computed information to display 44. Display 44 then presents the route information as an image on the screen. Route information referred to in this application means information necessary to guide vehicle 10 from its starting point to its destination along an optimal route. In the present embodiment, route information to be displayed comprises, as is shown in FIG. 5(A), a name of the road to which a vehicle should proceed immediately it leaves the road currently traversed (e.g., A Street as in FIG. 5), a distance between the vehicle's present location and the next road (e.g., 1.5 km), and an arrow representing the direction to take to turn into the next road. Route information is continuously re-computed and updated from the present location of the vehicle as it travels. Under normal conditions, an image on display 44 is updated immediately after the vehicle proceeds into the road whose name has just been displayed. Local navigation guidance is thus presented from the vehicle's starting point to the destination by repeating the above procedure. However, display of the distance from the present location of the vehicle to the next road is updated only at specified intervals, for example, every 500 m, according to the present embodiment.

Further, route information need not be limited to a road name, a distance, and an arrow, as shown in FIG. 5. It may include other information in addition thereto, or it may instead comprise entirely different information. The display may contain tabular data or voice instead of image, or voice and image may be jointly presented.

Optimal route computer 40 also judges, based on a vehicle's present location and its present optimal route, whether the vehicle is on or off the optimal route.

Figure 3:
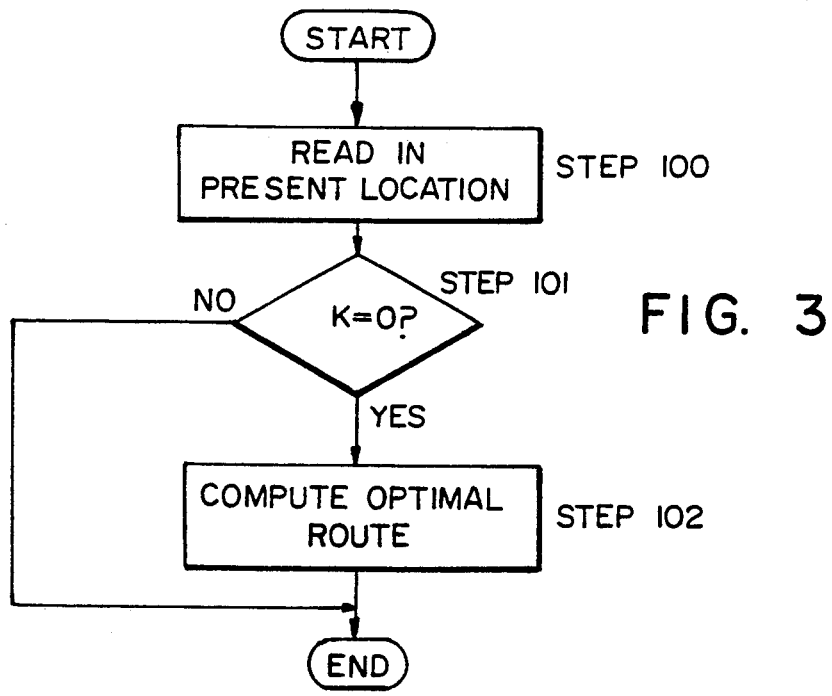
FIG. 3 is a flow chart illustrating computation of an optimal route executed before a vehicle starts for its destination (hereinafter the "original optimal route").

Referring to FIG. 3, when route computing command unit 30 is activated after a vehicle's destination is entered through input device 32, the program shown in the flow chart is executed.

When the program starts, the vehicle's present location is read in (Step 100). Then a decision is made whether the value in a memory K, which is dedicated to this purpose, is 0 (Step 101). If K=0, the original optimal route is computed in Step 102. If K≠0, the program ends without computing the original optimal route, and another program is invoked as described below to compute an optimal route for the initial condition that vehicle 10 is located off the original optimal route.

The initial value in memory K is 0. Therefore, when route computing command unit 30 is activated for the first time after initialization of the navigation system, an original optimal route is always computed.

Figure 4:
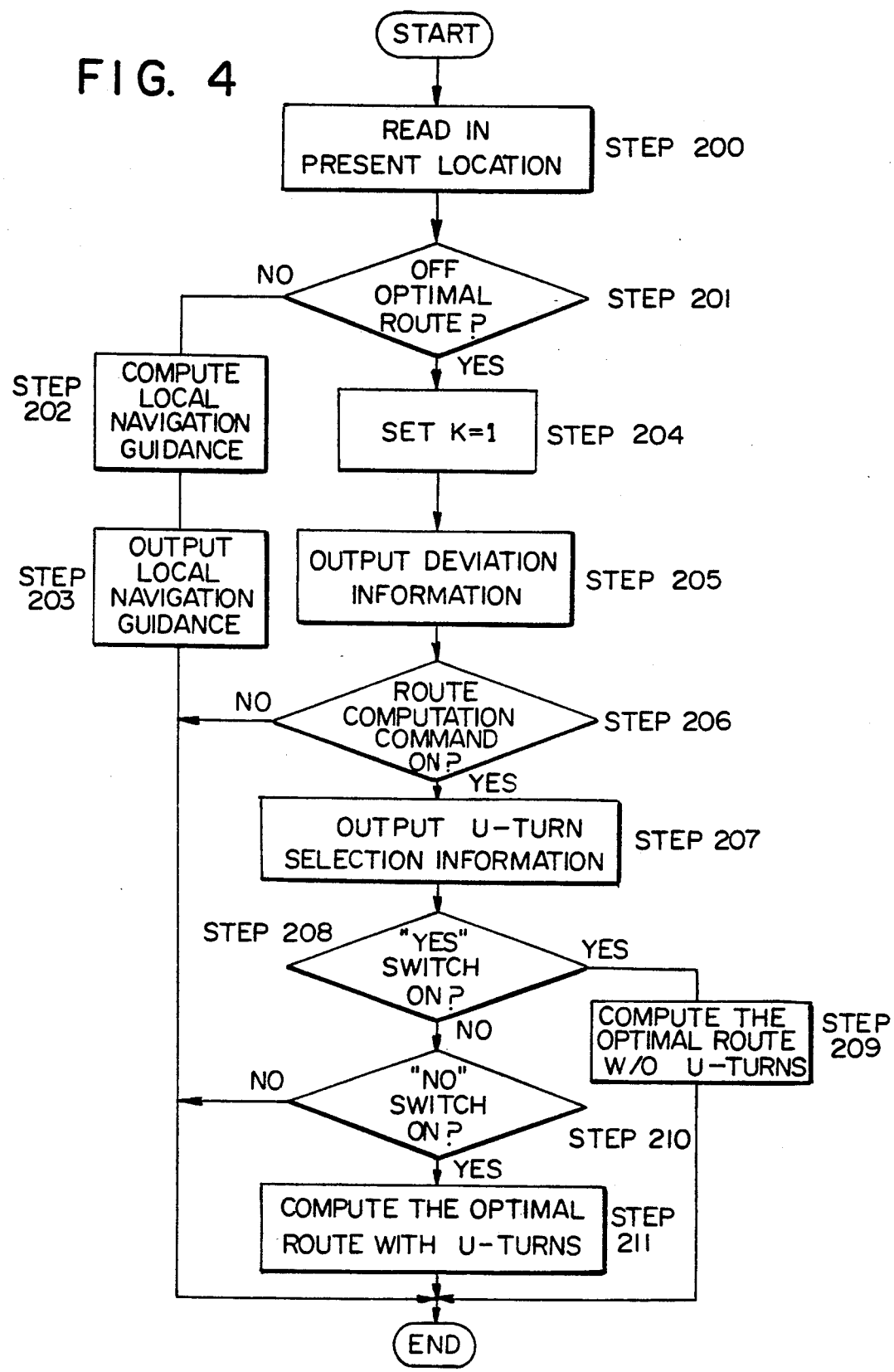
FIG. 4 is a flow chart illustrating display of local navigation guidance information and computation of an optimal route when a vehicle is off the original optimal route.

Referring to FIG. 4, a program that computes local navigation guidance from a starting point to a destination and re-computes an optimal route when a vehicle is off the original optimal route is executed at specified time intervals.

When the program starts, vehicle 10's present location is read in (Step 200). Then a decision is made (Step 201) whether the vehicle is off the optimal route. If the answer is negative, that is, when the vehicle is on the optimal route, local navigation guidance corresponding to the present location is computed (Step 202) and sent to display 44 (Step 203). There it is displayed to guide the driver of the vehicle to his destination.

Where vehicle 10 is off the optimal route (Step 201 returns "Yes"), the value "1" is written into memory K (Step 204). Information that the vehicle is off the optimal route is sent to display 44 to be displayed thereon (Step 205). In most cases, the information that the vehicle is off the optimal route is written into the internal memory of optimal route computer 40 beforehand. According to the present embodiment, the system displays a statement that reads "You are off your route. Find a new route?", as shown in FIG. 5(B).

Next (Step 206) a decision is made whether route computation command unit 30 has been turned on (i.e., whether a touch-sensitive switch as shown in FIG. 5(B) has been pressed). If route computation command unit 30 has not been turned on, the program ends.

If route computation command unit 30 has been turned on, U-turn selection data is sent to display 44 to be displayed thereon (Step 207). U-turn selection data is written into the internal memory of optimal route computer 40 beforehand, and, according to the present embodiment, the system displays a statement that reads "Prohibit U-turn?", as shown in FIG. 5(C).

In the present embodiment, U-turn selector 42 consists of a "YES" key 46 and a "NO" key 48 (see FIG. 5(C)). The program checks whether "YES" key 46 has been activated (Step 208). In cases where "YES" key 46 is on, the program computes an optimal route that excludes U-turns (Step 209). In other words, optimal route computer 40 finds the optimal route among the possible routes along which vehicle 10 can travel to its destination without reversing direction.

When a new optimal route is computed, the place initially entered as the destination is still used by optimal route computer 40 as vehicle 10's destination, while the present location of vehicle 10 becomes the new starting point.

In cases where "YES" key 46 has not been turned on, a decision is made whether "NO" key 48 has been turned on (Step 210). If "NO" key 48 has not been turned on either, the program ends.

If "NO" key 48 is turned on, computation of a new optimal route does not exclude U-turns (Step 211). In other words, optimal route computer 40 chooses an optimal route from vehicle 10's present location to the destination that satisfies normal conditions for optimal routes, for example, the shortest distance. The program ends after the new route is chosen.

Referring to FIG. 5, FIGS. 5(A), 5(B), and 5(C) each show a typical image presented on display 44 by the system of this invention in its present embodiment. FIG. 5(A) shows the typical display while the driver of vehicle 10 is following an optimal route chosen by optimal route computer 40. Presented in order from top to bottom are (1) the name of the next street to follow; (2) the distance from vehicle 10's present location to that street; and (3) an arrow representing the turn to be made by vehicle 10 into that street.

FIG. 5(B) shows the display when the program executed as in FIG. 4 finds that vehicle 10 is off the original optimal route. By pressing a touch screen key, the driver activates route computation command unit 30 to select a new optimal route.

FIG. 5(C) shows the display when Step 207 of the program flow charted in FIG. 4 has been executed. By pressing one of the two touch screen keys presented, the driver of vehicle 10 can choose whether or not to permit U-turns in the new optimal route to be chosen.

As described above, a navigation system according to the present invention displays information indicating that a vehicle is off the optimal route when that is the case and, by means of a U-turn selection means, either allows or prohibits routes that call for a U-turn to be included in computation of a new optimal route when the vehicle has deviated from the optimal route. Therefore, when a new optimal route is computed, the driver is able to select whether to return to the original optimal route, and consequently avoid such inconveniences as having to drive through a traffic jam or take a route that is not the true optimal route.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A navigation system, which comprises:
    means for storing map data;
    means for determining a present location of a vehicle with reference to said map data;
    means for commanding computation of a route to be traveled by said vehicle;
    means for computing, in accordance with said map data, an original optimal route from a starting point to a destination;
    said means for computing being also effective for computing, in accordance with said map data, a new optimal route from said present location of said vehicle to said destination;
    means for displaying route guidance information generated by said means for computing;
    means for detecting whether said vehicle has deviated from one of said original and said new optimal routes; and
    means for directing said means for computing to select one of allowing U-turns and preventing U-turns in following one of said original and said new optimal routes from said present location.

2. A navigation system as in claim 1, wherein said means for storing includes a CD ROM.

3. A navigation system as in claim 1, wherein said means for storing includes an IC card.

4. A navigation system as in claim 1, wherein said means for determining includes a shaft sensor.

5. A navigation system as in claim 1, wherein said means for determining includes a GPS satellite system.

6. A navigation system as in claim 1, wherein said means for determining includes a terrestrial magnetism sensor.

7. A navigation system as in claim 6, wherein said terrestrial magnetism sensor is a magnetic compass.

8. A navigation system as in claim 1, wherein said means for commanding includes a touch screen switch.

9. A navigation system as in claim 1, wherein said means for computing includes a microcomputer.

10. A navigation system as in claim 1, wherein said means for displaying includes a CRT.

11. A navigation system as in claim 1, wherein said means for displaying includes an LCD.

12. A navigation system as in claim 1, wherein said means for directing includes at least one touch screen switch.

13. A method of navigating a vehicle, which comprises the steps of:
    storing map data;
    determining a present location of said vehicle with reference to said map data;
    computing, in accordance with said map data, an original optimal route from a starting point of said vehicle to a destination;
    computing further, in accordance with said map data, a new optimal route from said present location of said vehicle to said destination;
    displaying route guidance information generated by said means for computing;
    detecting, with reference to one of said original and said new optimal routes and said present location, whether said vehicle has deviated from said one of said original and said new optimal routes; and
    said step of displaying selectively allowing and prohibiting the display of said route guidance information that returns said vehicle to an original optimal route.

14. A method according to claim 13, wherein the step of displaying includes selectively allowing and prohibiting display of said route guidance information leading to U-turns in following said new optimal route from said present location.

15. A navigation system for a vehicle, which comprises:
    a CD ROM containing map data;
    a shaft sensor mounted on said vehicle;
    a magnetic compass mounted on said vehicle;
    said shaft sensor and said magnetic compass sending signals that determine a present location of said vehicle with reference to said map data;
    a microcomputer;
    said microcomputer receiving said signals;
    said microcomputer including first means for computing, in accordance with said map data, an original optimal route from a starting point to a destination;
    said microcomputer further including second means for computing, in accordance with said map data, a new optimal route from said present location of said vehicle to said destination;
    means for detecting, with reference to said original optimal route and said present location, whether said vehicle has deviated from said original optimal route;
    means for selectively allowing and prohibiting said second computing means to use the U-turns in computing said new optical route;
    means for displaying route guidance, deviation, and said U-turns generated by said microcomputer;
    said second means for computing including means for permitting said new optimal route to intersect said original optimal route in the minimum amount of time when said means for selectively allowing and prohibiting is in a mode of allowing; and
    said second means for computing further including means for preventing said new optimal route from intersecting said original optimal route in a minimum time when said means for selectively allowing and prohibiting is in a mode for prohibiting.

* * * * *